No. 892,272. PATENTED JUNE 30, 1908.
C. LATSCH.
TROLLEY GUARD AND GUIDE.
APPLICATION FILED SEPT. 3, 1907.

WITNESSES:
E. M. Fisher
F. C. Museum

INVENTOR.
Charles Latsch
BY
Fisher & Moser
ATTORNEYS.

UNITED STATES PATENT OFFICE.

CHARLES LATSCH, OF CLEVELAND, OHIO, ASSIGNOR OF TWENTY-FOUR ONE-HUNDREDTHS TO C. A. MUELLER AND TWENTY-FOUR ONE-HUNDREDTHS TO JOS. H. WENNEMAN, OF CLEVELAND, OHIO.

TROLLEY GUARD AND GUIDE.

No. 892,272.  Specification of Letters Patent.  Patented June 30, 1908.

Application filed September 3, 1907. Serial No. 391,161.

*To all whom it may concern:*

Be it known that I, CHARLES LATSCH, a citizen of the United States, residing at Cleveland, in the county of Cuyahoga and State of Ohio, have invented certain new and useful Improvements in Trolley Guards and Guides, and do declare that the following is a full, clear, and exact description of the invention, which will enable others skilled in the art to which it appertains to make and use the same.

My invention relates to trolley guards and guides, and the object of the invention is to provide a guard which will prevent the trolley wheel from jumping off the wire, and if it should happen to get off that the guide mechanism will assist in restoring the wheel to the wire, all substantially as shown and described and particularly pointed out in the claims.

Figure 1:
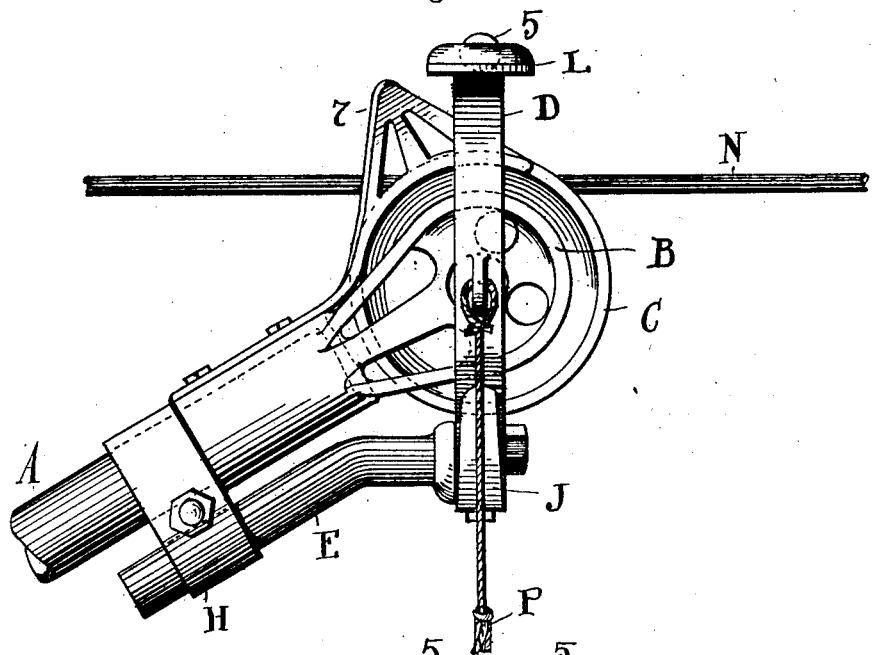
Figure 2:
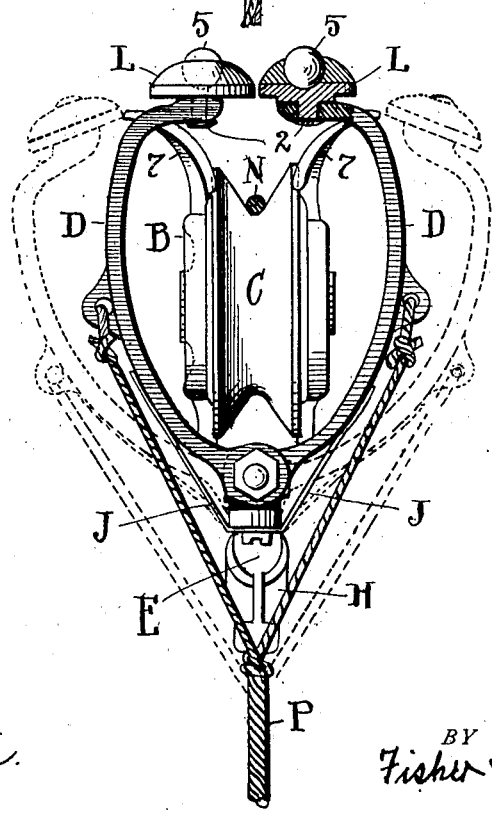

In the accompanying drawings, Figure 1 is a side elevation of a trolley wheel harp or support and the wheel, and my new and original guard and guide mechanism thereon. Fig. 2 is a front elevation of the said parts, showing them closed in full lines, as in action, and in dotted lines as they appear when the guard is opened to restore the wheel to the wire.

A represents an ordinary trolley pole and B the harp or wheel support at the top thereof, in which wheel C has any suitable bearings.

D represents a pair of guard members or arms which are supported in a vertical position or relation on opposite sides of the axis or center of wheel C by means of a special arm E, fixed on pole A by means of clamp H, or its equivalent, and having said guards D pivotally supported side by side on the outer end thereof. A suitable spring or springs J are fixed on the said arm E in such relation to guards D as to exert an upward and inward pressure thereon, thereby holding said guards together in working relations at their top or upper ends relatively as seen in full lines, Fig. 2. To this end, also, the said guards are curved between their ends to adapt them to extend around wheel C and meet, or approximately meet, over or above the wheel. Actual meeting or contact between the said parts is effected through rollers or wheels L, which have short spindles 2 at their bottom set vertically in suitable bearings in the extremities of said guards and adapted to bear one against the other at their edges under all normal conditions and thus close line wire N within said guards and guard rollers. The position of the rollers on the guards is horizontal when the trolley is in use, and the bottom sides of the rollers are flat and flush with each other. Rolling members like L, or their equivalent are necessary to pass the frequent suspensory wires which carry wire N and which pass between said rollers as the trolley follows the wire, the rollers turning and separating enough to let them pass. Then again there are plates or frogs encountered where roads intersect or diverge and which require adaptation of my guard thereto. To this end I have placed spherical rollers or balls 5 in the top of rollers L and which are free to turn in any direction therein as they contact with such plates or frogs.

Trolley cord P is divided at its upper end and extends to guard arms D near their middle so as to get a grip thereon to pull them apart at their top when for any reason it becomes necessary to place the trolley wheel on the wire. This lateral pull on said arms is against spring J to position dotted lines, Fig. 2, as the maximum, the function of said spring being to hold arms D in working position. Hence if the trolley gets off the wire and guard members D are spread to get it back, the guides 7 will help to guide the wire back to the wheel. The guard members D and their supporting arm E may be attached to trolleys in general use and are a separate article of manufacture and sale.

What I claim is:—

1. A trolley harp having a trolley wheel mounted therein and a pole supporting the harp, in combination with an arm fixed detachably on said pole and extending beneath said wheel, a pair of guard members pivotally supported from said arm across the axis of the trolley wheel, rollers mounted in the free ends of said guard members and arranged to meet over the trolley wheel, springs to hold said arms in working position, and guards on the trolley harp bridging the space at each side between the trolley wheel and the said rollers.

2. A pair of guard members for trolley wheels having rollers adapted to contact at their periphery and bearing balls mounted in the top of said rollers and free to turn therein.

3. The combination of the trolley support and trolley wheel therein, with hinged side guards having rollers in their upper ends over said wheel and bearing balls freely mounted in the top and center of said rollers and extending above the same.

In testimony whereof I sign this specification in the presence of two witnesses.

CHARLES LATSCH.

Witnesses:
R. B. MOSER,
E. M. FISHER.